(12) United States Patent
Zhan et al.

(10) Patent No.: US 8,966,294 B2
(45) Date of Patent: Feb. 24, 2015

(54) CLAMP CIRCUITS FOR POWER CONVERTERS

(75) Inventors: Xiaodong (David) Zhan, Plano, TX (US); Long (Robin) Yu, Hangzhou (CN); Shijia (Billy) Yang, Hangzhou (CN)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 13/389,198

(22) PCT Filed: Aug. 12, 2011

(86) PCT No.: PCT/CN2011/078349
§ 371 (c)(1),
(2), (4) Date: Feb. 6, 2012

(87) PCT Pub. No.: WO2013/023343
PCT Pub. Date: Feb. 21, 2013

(65) Prior Publication Data
US 2014/0157015 A1    Jun. 5, 2014

(51) Int. Cl.
*H02M 3/335* (2006.01)
*H02M 1/34* (2007.01)
(Continued)

(52) U.S. Cl.
CPC ............ *H02M 3/33507* (2013.01); *H02M 1/34* (2013.01); *H02M 3/33592* (2013.01);
(Continued)

(58) Field of Classification Search
CPC ....................... H02M 3/33507; H02M 3/33576
USPC .................................. 363/17, 21.03; 713/300
See application file for complete search history.

(56) References Cited

U.S. PATENT DOCUMENTS 6,992,902 B2 *   1/2006   Jang et al. ........................ 363/17
7,791,904 B2 *   9/2010   Zhang et al. ..................... 363/17
(Continued)

FOREIGN PATENT DOCUMENTS

CN      101030731       9/2007
CN      101127482       2/2008
JP      2009232621      10/2009

OTHER PUBLICATIONS

Heldwein et al., "A Primary Side Clamping Circuit Applied to the ZVS-PWM Asymmetrical Half-Bridge Converter", "IEEE", 2000, pp. 199-204, Publisher: Power Electronics Institute.
(Continued)

*Primary Examiner* — Albert Wang
(74) *Attorney, Agent, or Firm* — Fogg & Powers LLC

(57) ABSTRACT

A power converter comprises an input port configured to receive a source of power, an output port configured to provide output power, and a bridge circuit coupled to the input port. The bridge circuit comprises a first switch coupled in series with a second switch, and a third switch coupled in series with a fourth switch. A first clamp rectifier is coupled in series with a second clamp rectifier, and the first and second clamp rectifiers are coupled in parallel with the first and second switches. A first clamp capacitor is coupled between the first and second clamp rectifiers, with the first clamp capacitor operative to reduce power loss in the first and second clamp rectifiers. A first resonant inductor is coupled between the first and second switches. The power converter also includes a transformer operatively coupled to the bridge circuit, with the transformer comprising a primary winding and at least one secondary winding. A current rectifying circuit is operatively coupled to the secondary winding of the transformer and the output port.

23 Claims, 5 Drawing Sheets

(51) Int. Cl.
  *G06F 1/32*  (2006.01)
  *G06F 1/26*  (2006.01)
(52) U.S. Cl.
  CPC ...... *H02M2001/346* (2013.01); *Y02B 70/1433* (2013.01); *Y02B 70/1475* (2013.01); *Y02B 70/1491* (2013.01); *G06F 1/32* (2013.01); *H02M 3/33576* (2013.01)
  USPC .......................... 713/300; 363/17; 363/21.03

(56) References Cited

U.S. PATENT DOCUMENTS 8,724,348 B2 * 5/2014 Sase et al. .................. 363/21.06

2008/0043495 A1   2/2008  Jungreis

OTHER PUBLICATIONS

Redl et al., "Optimum ZVS Full-Bridge DC/DC Converter with PWM Phase-Shift Control: Analysis, Design Considerations, and Experimental", "IEEE", 1994, pp. 159-165.

The International Bureau of WIPO, Internationational Preliminary Report on Patentability from PCT Application No. PCT/CN2011/078349 mailed Feb. 27, 2014, from PCT Counterpart of U.S. Appl. No. 13/389,198, filed Feb. 27, 2014, pp. 1-6, Published in: WO.

International Searching Authority, "International Search Report", Mailed May 17, 2012, Published in: WO.

* cited by examiner

CLAMP CIRCUITS FOR POWER CONVERTERS

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, reference is made to the accompanying drawings that form a part hereof, and in which is shown by way of illustration specific illustrative embodiments. It is to be understood that other embodiments may be utilized and that logical, mechanical, and electrical changes may be made. The following detailed description is, therefore, not to be taken in a limiting sense.

Clamp circuits are provided for power converters such as Zero Voltage Switching (ZVS) full-bridge DC/DC converters. In one approach, a clamp capacitor is coupled between clamp rectifiers and a transformer in the converter to reduce the power loss in the clamp rectifiers. In a further approach, a resonant inductor is split into two inductor halves, with the second half of the resonant inductor placed together with the clamping circuit to make the power circuit and peak current waveform symmetric. This eliminates the risk of transformer saturation and reduces the size of an input electromagnetic interference (EMI) filter that can be coupled to the power converter.

In the schematic diagrams described hereafter, wires that cross one another do not make electrical contact to one another unless there is a small dot shown at their crossing.

Figure 1:
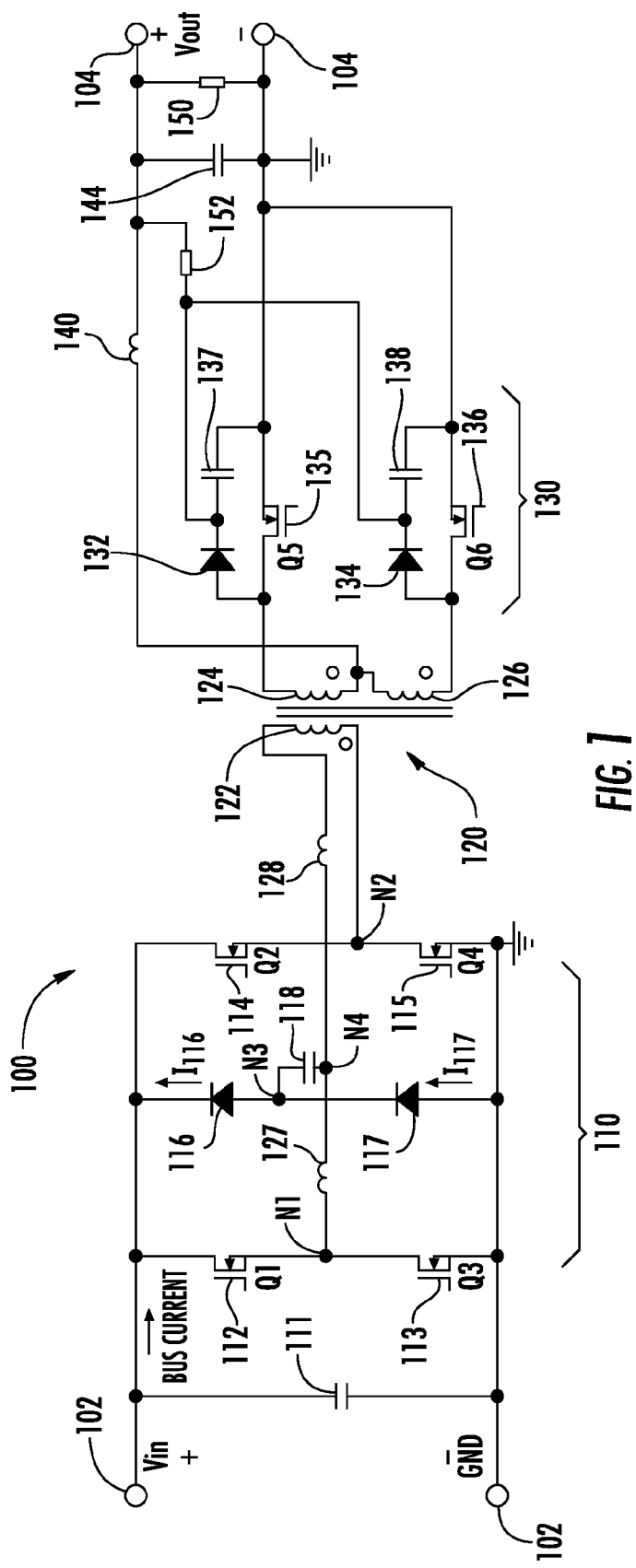
FIG. 1 is a schematic diagram of an exemplary full-bridge DC-output converter according to one embodiment.

FIG. 1 is a schematic diagram of an exemplary ZVS asymmetric full-bridge DC-output converter 100 according to one embodiment. The converter 100 includes an input port 102 to receive a source of power (at a voltage Vin connected to ground) to be converted, and an output port 104 to provide a direct current (DC) output power at a voltage Vout. A bridge circuit 110 applies the input power to a transformer 120, which is coupled to a rectifying circuit 130. An output inductor 140 is coupled between transformer 120 and output port 104, and an output capacitor 144 is coupled in parallel with output port 104. A first resistor 150 is also coupled in parallel with output port 104 to represent the load. The transformer 120 has a primary winding 122, a top secondary winding 124, and a bottom secondary winding 126.

The bridge circuit 110 comprises an input capacitor 111 coupled in parallel with input port 102. A first switch 112 (Q1) and a second switch 113 (Q3) are coupled in series at a first node N1, and a third switch 114 (Q2) and a fourth switch 115 (Q4) are coupled in series at a second node N2. Each of switches 112-115 comprise a semiconductor switching device (e.g., field effect transistor (FET)), which has a parasitic capacitance disposed in parallel with the switch conduction terminals, and have a parasitic conduction diode similarly disposed. Each semiconductor device also has a modulation terminal (e.g., gate, base, etc.), to which a control signal is applied to control the flow of current between the device's conduction terminals. In an alternative embodiment, a bipolar junction transistor (BJT) or isolated gate bipolar transistor (IGBT) can be utilized as the semiconductor switching device, in parallel with one or more external diodes, as the BJT and IGBT do not have a parasitic conduction diodes.

The series combination of switches 112 and 113 are coupled in parallel with input port 102, and the series combination of switches 114 and 115 are also coupled in parallel with input port 102. Each of nodes N1 and N2 is electrically coupled to a terminal of primary winding 122 of transformer 120. The node N1 is coupled to primary winding 122 by way of a resonant inductor 127. An inductor 128 represents the transformer leakage inductance.

A first clamp rectifier 116 and a second clamp rectifier 117 are coupled in series at a third node N3. The clamp rectifiers can be a clamp diode or a synchronous rectifier. The clamp rectifiers 116 and 117 are coupled in parallel with input port 102 and switches 112 and 113. A clamp capacitor 118 is coupled between clamp rectifiers 116 and 117 at node N3 and a fourth node N4. The node N4 is located between inductors 127 and 128, which are coupled to primary winding 122 of transformer 120. The clamp capacitor 118 reduces the power loss in clamp rectifiers 116 and 117.

The rectifying circuit 130 has a first diode 132 coupled between top secondary winding 124 and output port 104, and a second diode 134 coupled between bottom secondary winding 126 and output port 104. A fifth switch 135 (Q5) is coupled between top secondary winding 124 and output port 104, and a sixth switch 136 (Q6) is coupled between bottom secondary winding 126 and output port 104. The rectifying circuit 130 also includes a first capacitor 137 coupled between diode 132 and output port 104, and a second capacitor 138 coupled between diode 134 and output port 104. A second resistor 152 is coupled between diodes 132, 134 and output port 104.

The leg between switches 112 and 113 (Q1, Q3) and the leg between switches 114 and 115 (Q2, Q4) are not symmetric because of the use of one resonant inductor 127 and one set of clamp rectifiers 116, 117. In addition, the current ($I_{116}$) in clamp rectifier 116 and the current ($I_{117}$) in clamp rectifier 117 are not the same.

During operation, switches 113 and 114 may be closed (placed in conducting states) at the same time to cause power and a positive voltage to be applied to primary winding 122 of transformer 120 and to cause current to flow into primary winding 122. This causes current to flow out of top secondary winding 124 through inductor 140. The current is sent to output capacitor 144 and the load at output port 104, and returns back to top secondary winding 124 through switch 135 (FET Q5). On the other hand, switches 112 and 115 may be closed to apply a negative voltage to primary winding 122 and to cause current to flow out of primary winding 122. This causes current to flow out of bottom secondary winding 126 and through inductor 140. The current is sent to output capacitor 144 and the load at output port 104, and returns back to bottom secondary winding 126 through switch 136 (FET Q6). Thus, the application of either positive voltage or negative voltage to primary winding 122 provides power to output port 104. The diode 132, capacitor 137, and resistor 152 form a RCD snubber circuit to eliminate the voltage spike on switch 135. The diode 134, capacitor 138, and resistor 152 form another RCD snubber circuit to eliminate the voltage spike on switch 136.

The voltage at output port 104 can be regulated by controlling the amount of power provided by output inductor 140, which in turn can be controlled by controlling the time duration that the switch pairs are conducting. When power is not being provided to inductor 140, both of switches 112 and 114 are placed in conducting states to provide a voltage near zero volts across the transformer windings so that inductor 140 may have a free-wheeling current path through one or both of switches 135 and 136 (FETs Q5 and Q6). This near zero-voltage condition may also be provided by placing both of switches 113 and 115 in conducting states. The free-wheeling current of inductor 140 is reflected back to primary winding 122, and keeps current flowing and energy stored in transformer leakage inductor 128, and also in resonant inductor 127.

When the commutation of the switches 135, 136 (Q5, Q6) is ended, the reverse recovery current in body diodes of Q5 or Q6 will be limited by the resonant inductor 127 and leakage inductance 128 (represented by inductor 128). During reverse recovery time, the transformer windings 124, 126, and 122 are all shorted. Vin is applied to resonant inductor 127 and leakage inductance 128 through switches 112 and 115, or switches 114 and 113. A current higher than the load is then built up in resonant inductor 127 and leakage inductance 128. After the reverse recovery in the body diodes of Q5 or Q6 is finished, the load current is then fully commuted from body diodes of Q5 or Q6 to body diodes of Q6 or Q5. The current in transformer winding 122 is the only load current (current in inductor 140 divides by transformer turns ratio). The higher part of the current in resonant inductor 127 is then freewheeling in rectifiers 116 or 117 through capacitor 118. Since the DC current will be blocked by the capacitor 118, the mean current in rectifiers 116 and 117 is balanced. The capacitor 118 also allows part of the current to flow to the respective switch 114 or 115 instead of rectifiers 116 or 117. This will significantly lower the power dissipation of the primary clamp circuit and thus make it easier to deal with heat dissipation.

Figure 2:
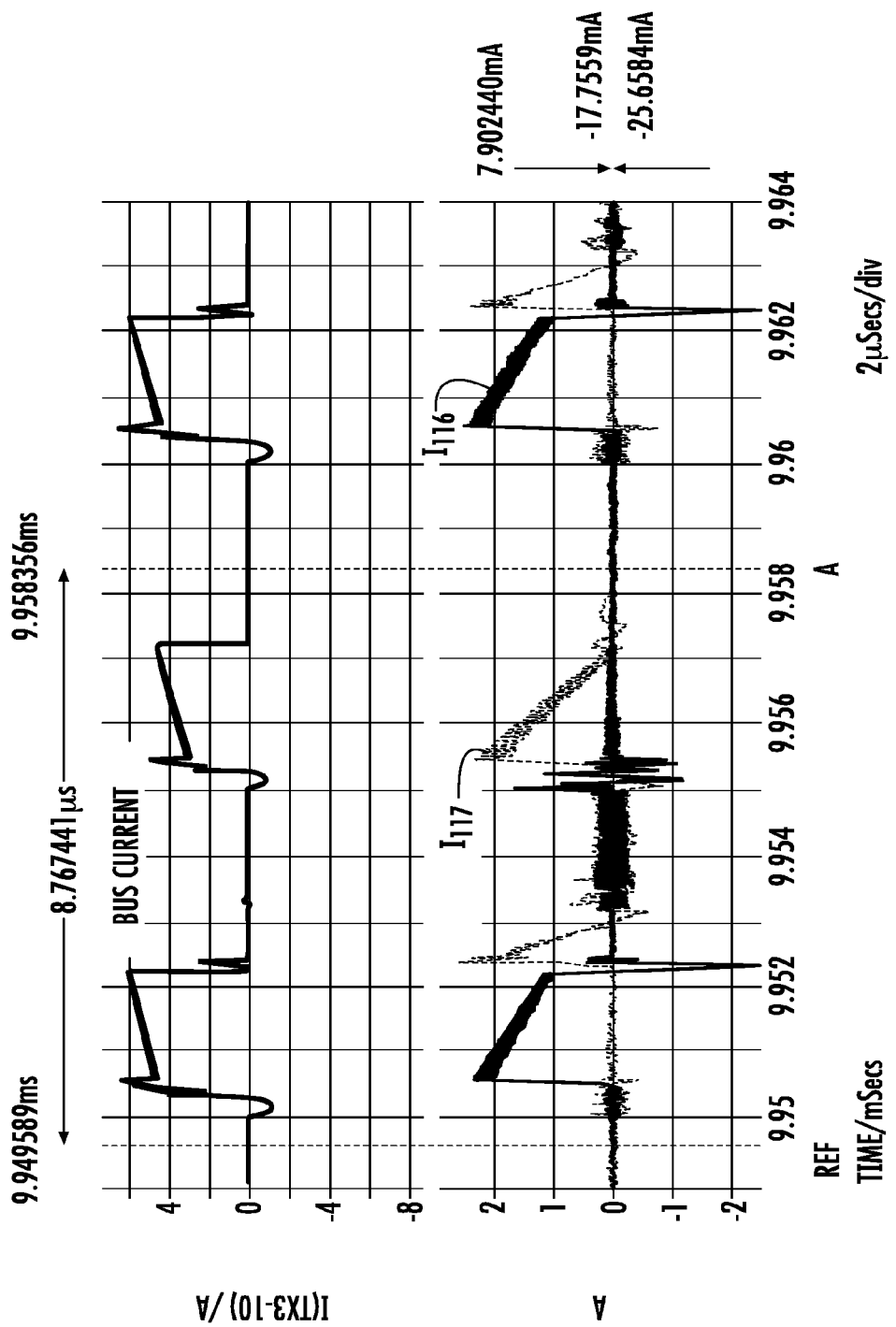
FIG. 2 is a graph of the currents probed during a simulation of the converter of FIG. 1.

FIG. 2 is a graph of the currents probed during a simulation of converter 100. The bus current and current in clamp rectifiers (diodes) 116 and 117 ($I_{116}$ and $I_{117}$) are shown in the graph of FIG. 2. These currents were probed at 450 V input and 12 V, 670 W output conditions. The current flows through clamp rectifiers (diodes) 116 and 117 had an average value of about 298 mA and 281 mA, respectively.

For comparative purposes, a ZVS asymmetric full-bridge DC-output converter having similar components as converter 100, except without clamp capacitor 118, was also probed at 450 V input and 12 V, 670 W output conditions. The average value of the current in a first clamp diode was about 420 mA and the average value of the current in a second clamp diode was about 848 mA in one period.

Thus, the current flows through the clamp diodes were significantly reduced by having clamp capacitor 118 in converter 100.

Figure 3:
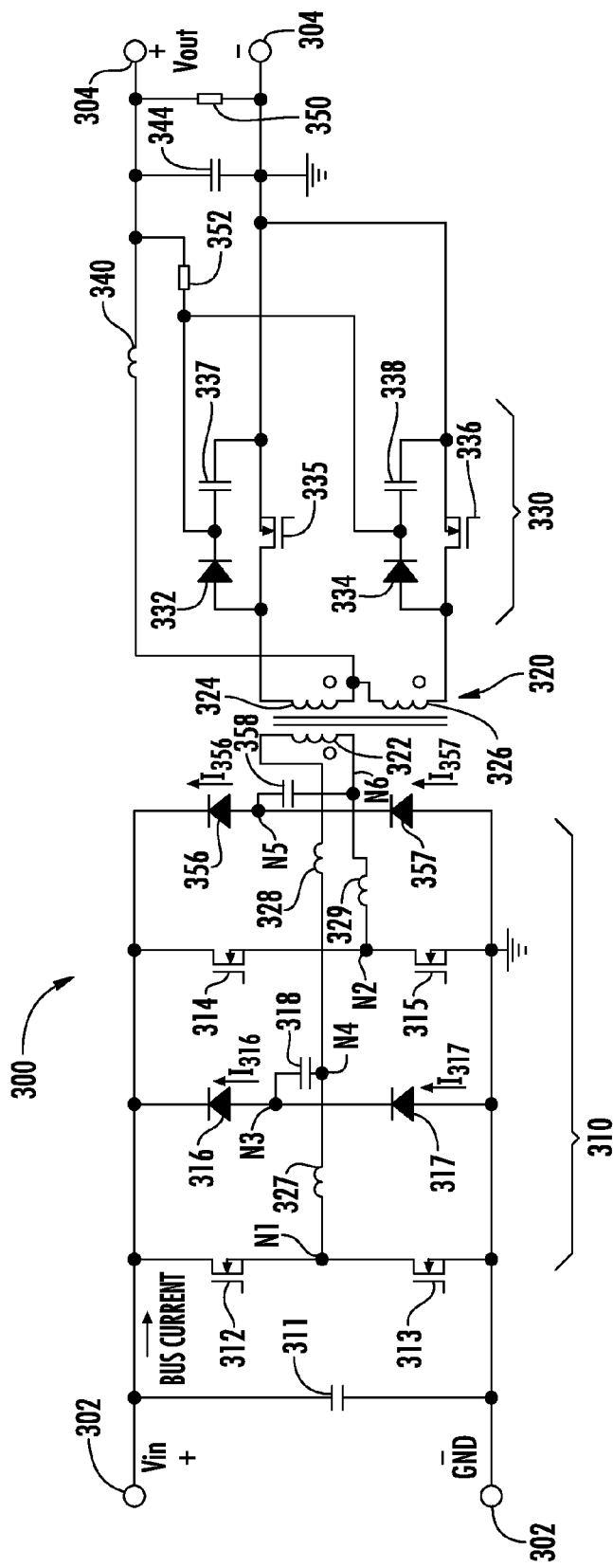
FIG. 3 is a schematic diagram of an exemplary full-bridge DC-output converter according to another embodiment.

FIG. 3 is a schematic diagram of an exemplary ZVS symmetric full-bridge DC-output converter 300 according to another embodiment. The converter 300 includes similar features as converter 100, including an input port 302 and an output port 304. A bridge circuit 310 applies the input power to a transformer 320, which is coupled to a rectifying circuit 330. An output inductor 340 is coupled between transformer 320 and output port 304, and an output capacitor 344 is coupled in parallel with output port 304. A first resistor 350 is also coupled in parallel with output port 304 to represent the load. The transformer 320 has a primary winding 322, a top secondary winding 324, and a bottom secondary winding 326.

The bridge circuit 310 comprises an input capacitor 311 coupled in parallel with input port 302. A first switch 312 and a second switch 313 are coupled in series at a first node N1, and a third switch 314 and a fourth switch 315 are coupled in series at a second node N2. The node N1 is coupled to primary winding 322 by way of a first resonant inductor 327. An inductor 328 represents the transformer leakage inductance.

The rectifying circuit 330 has a fifth switch 335 coupled between top secondary winding 324 and output port 304, and a sixth switch 336 coupled between bottom secondary winding 326 and output port 304. A first diode 332 is coupled between top secondary winding 324 and output port 304 by way of a second resistor 352, and a second diode 334 is coupled between bottom secondary winding 326 and output port 304 also by way of second resistor 352. The rectifying circuit 330 also includes a first capacitor 337 coupled between diode 332 and output port 304, and a second capacitor 338 coupled between diode 334 and output port 304. The diode 332, capacitor 337, and resistor 352 form a snubber circuit to eliminate the voltage spike on switch 335. The diode 334, capacitor 338, and resistor 352 form another snubber circuit to eliminate the voltage spike on switch 336.

A first clamp rectifier such as a clamp diode 316 and a second clamp rectifier such as a clamp diode 317 are coupled in series at a third node N3. The diodes 316 and 317 are coupled in parallel with input port 302 and switches 312 and 313. A first clamp capacitor 318 is coupled between diodes 316 and 317 at node N3 and a fourth node N4. In addition, a third clamp rectifier such as a clamp diode 356 and a fourth clamp rectifier such as a clamp diode 357 are coupled in series at a fifth node N5. The clamp diodes 356 and 357 are coupled in parallel with switches 314 and 315. A second clamp capacitor 358 is coupled between clamp diodes 356 and 357 at node N5 and a sixth node N6. A second resonant inductor 329 is coupled between nodes N2 and N6 and is in electrical communication with primary winding 322.

The leg between switches 312 and 313 and the leg between switches 314 and 315 are symmetric because of the two resonant inductors 327, 329 and the two sets of clamp diodes (316, 317 and 356, 357). The inductance values of resonant inductors 327 and 329 are the same, with each at half of the inductance of the resonant inductor 127 of converter 100 in FIG. 1, to keep the same ZVS operation conditions of switches 312, 313, 314, and 315.

During operation, switches 313 and 314 may be closed at the same time to cause power and a positive voltage to be applied to primary winding 322 of transformer 320 and to cause current to flow into primary winding 322. This causes current to flow out of top secondary winding 324 through inductor 340. The current is sent to output capacitor 344 and the load at output port 304, and returns back to top secondary winding 324 through switch 335. On the other hand, switches 312 and 315 may be closed to apply a negative voltage to primary winding 322 and to cause current to flow out of primary winding 322. This causes current to flow out of bottom secondary winding 326 and through inductor 340. The current is sent to output capacitor 344 and the load at output port 304, and returns back to bottom secondary winding 326 through switch 336. Thus, the application of either positive voltage or negative voltage to primary winding 322 provides power to output port 304.

The voltage at output port 304 can be regulated by controlling the amount of power provided by output inductor 340, which in turn can be controlled by controlling the time duration that the switch pairs are conducting. When power is not being provided to inductor 340, both of switches 312 and 314 are placed in conducting states to provide a voltage near zero volts across the transformer windings so that inductor 340 may have a free-wheeling current path through one or both of switches 335, 336. This near zero-voltage condition may also be provided by placing both of switches 313 and 315 in conducting states. The free-wheeling current of inductor 340 is reflected back to primary winding 322, and keeps current flowing and energy stored in transformer leakage inductor 328, and also in resonant inductors 327 and 329.

The clamp capacitor 318 balances the current in diode 316 and 317 and allows part of the current to flow to the respective switch 314 or 315 instead of diodes 316 or 317. This will significantly lower the power dissipation on diodes 316, 317 and thus make it easier to deal with heat dissipation. In addition, the clamp capacitor 358 balances the current in diodes 356, 357 and allows part of the current to flow to the respective switch 312 or 313 instead of diodes 356 or 357. This will significantly lower the power dissipation on diodes 356 and 357 and thus make it easier to deal with heat dissipation.

Figure 4:
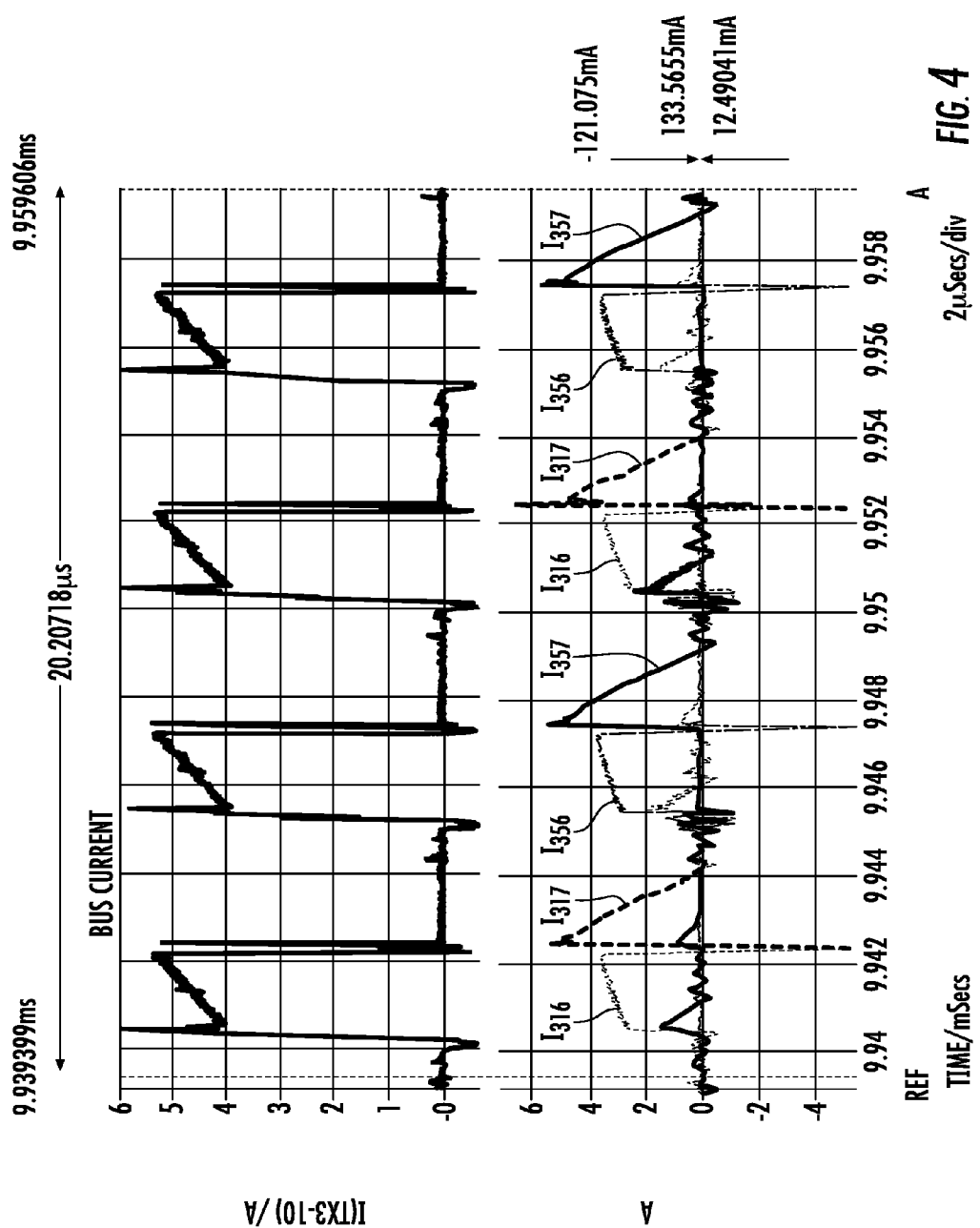
FIG. 4 is a graph of the currents probed during a simulation of the converter of FIG. 3.

FIG. 4 is a graph of the currents probed during a simulation of converter 300. The bus current and the current in clamp diodes 316, 317, 356, 357 ($I_{316}$, $I_{317}$, $I_{356}$, $I_{357}$) are shown in the graph of FIG. 4. These currents were probed at 450 V input and 12 V, 670 W output conditions. The current flows through clamp diodes 316, 317, 356, 357 had an average value of about 500 mA. Although the current flow through the clamp diodes 316, 317, 356, 357 are higher than in the clamp diodes of converter 100, the current flow is still at an acceptable level.

The primary clamp circuits of converter 300 reduce the power loss in the clamp diodes and also make the input bus current symmetric, which is in favor of a peak current mode control. Compared with converter 100, the symmetric primary clamp circuits of converter 300 guarantee the same bus currents between two half cycles and eliminate the risk of saturation of the transformer in peak current mode control because the bus current is sensed and used to compare to the voltage error signal to generate pulse wave modulation (PWM) control signals for the four switches of the bridge converter. With symmetric bus current signals in two half cycles, the PWM signals for two bridge legs are symmetric with 180 degree phase shift. The time duration of both switches 313 and 314 in on state will be equal to the time duration of both switches 312 and 315 in on state. This guarantees the volt-seconds applied to the transformer primary winding 322 in both positive and negative cycles are equal.

On the other hand, in converter 100 the bus current signals are not equal between the two half cycles as shown in FIG. 2. Peak current mode control cannot be used as it will cause transformer volt-seconds imbalance and lead to transformer saturation.

Since the lowest harmonic current frequency is doubled, an EMI filter size can be reduced. Due to the symmetric input current waveform, the EMI filter size can be further reduced by interleaving different paralleled DC/DC converters on a high input voltage bus.

Figure 5:
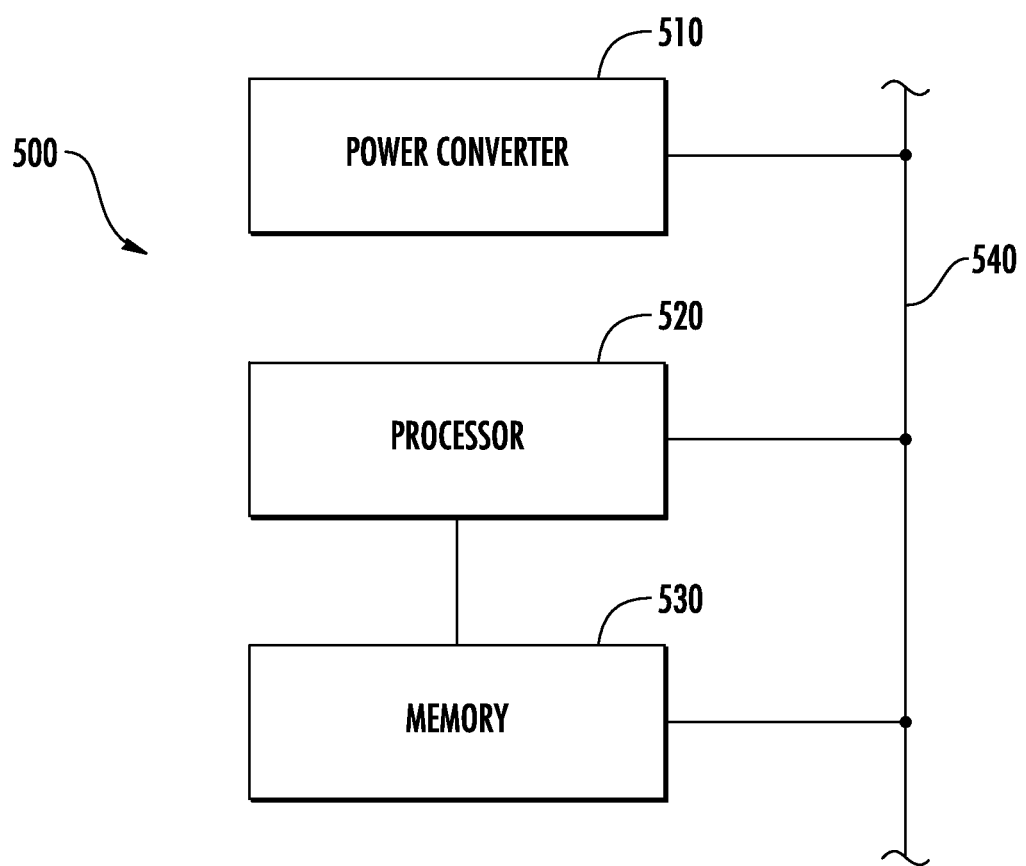
FIG. 5 is a block diagram of an electronic system that is implemented with a full-bridge DC-output converter according to an exemplary embodiment.

FIG. 5 is a block diagram of an electronic system 500 that includes a power converter 510, which can use ZVS full-bridge DC-output converters, such as shown in FIG. 1 or FIG. 3, to convert a DC or AC input to a DC output. The output of the power converter 510 is electrically coupled to at least one processor 520 and at least one memory device 530. For example, a bus 540 can provide electrical connections between power converter 510, processor 520, and memory device 530. The processor 520 and memory device 530 are also electrically coupled to each other.

The clamp circuit shown in FIG. 1 and FIG. 3 can also be used in a phase shift ZVS DC/DC converter or any other ZVS DC/DC converter with external resonant inductor to achieve similar benefit as described above.

A method according to the present approach comprises receiving an input DC voltage at a resonant inductor coupled to a transformer and a clamp capacitor. Control signals are generated for a first switch and a second switch coupled to the transformer. Electrical energy is stored in the resonant inductor from the input DC voltage when the control signals turn on both the first and second switches. Energy is released from the resonant inductor through the transformer when the control signals turn on only one of the first and second switches. The clamp capacitor allows part of a current to flow to a third switch or a fourth switch to reduce power loss in one or more clamp rectifiers.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that the invention be limited only by the claims and the equivalents thereof.

What is claimed is:

1. A power converter, comprising:
an input port configured to receive a source of power;
an output port configured to provide output power;
a bridge circuit operatively coupled to the input port, the bridge circuit comprising:
  a first switch coupled in series with a second switch through a first connection node;
  a third switch coupled in series with a fourth switch through a second connection node;
  a first clamp rectifier coupled in series with a second clamp rectifier through a third connection node, wherein the first and second clamp rectifiers are coupled in parallel with the first and second;
  a first resonant inductor coupled directly to the first connection node and directly to a fourth connection node;
  a first clamp capacitor coupled between the third connection node and the fourth connection node, the first clamp capacitor operative to reduce power loss in the first and second clamp rectifiers; and
a transformer operatively coupled to the bridge circuit, the transformer comprising a primary winding and at least one secondary winding, the primary winding coupled between the second connection node and the fourth connection node; and
a current rectifying circuit operatively coupled to the secondary winding of the transformer and the output port.

2. The power converter of claim 1, wherein the first and second switches are coupled in parallel with the input port, and the third and fourth switches are coupled in parallel with the input port.

3. The power converter of claim 1, wherein the switches each comprise a semiconductor switching device.

4. The power converter of claim 3, wherein the semiconductor switching device comprises a transistor.

5. The power converter of claim 1, wherein the first and second clamp rectifiers are coupled in parallel with the input port.

6. The power converter of claim 1, further comprising an output inductor coupled between the secondary winding of the transformer and the output port.

7. The power converter of claim 1, further comprising an output capacitor coupled in parallel with the output port, and a first resistor coupled in parallel with the output port.

8. The power converter of claim 1, wherein the rectifying circuit comprises a first diode coupled between the secondary winding and the output port, and a second diode coupled between the secondary winding and the output port.

9. The power converter of claim 8, wherein the rectifying circuit further comprises a fifth switch coupled between the secondary winding and the output port, and a sixth switch coupled between the secondary winding and the output port.

10. The power converter of claim 9, wherein the rectifying circuit further comprises a first capacitor coupled between the first diode and the output port, and a second capacitor coupled between the second diode and the output port.

11. The power converter of claim 8, further comprising a second resistor coupled between the first diode and the output port.

12. The power converter of claim 1, wherein the transformer comprises a top secondary winding coupled to the current rectifying circuit, and a bottom secondary winding coupled to the current rectifying circuit.

13. The power converter of claim 1, wherein the power converter is a zero voltage switching asymmetric full-bridge DC-output converter.

14. The power converter of claim 1, wherein the bridge circuit further comprises
    a third clamp rectifier coupled in series with a fourth clamp rectifier through a fifth connection node, wherein the third and fourth clamp rectifiers are coupled in parallel with the third and fourth switches;
    a second resonant inductor coupled between the second connection node and a sixth connection node; and
    a second clamp capacitor coupled between the fifth connection node and the sixth connection node, the second clamp capacitor operative to reduce power loss in the third and fourth clamp rectifiers.

15. The power converter of claim 1, wherein the first and second resonant inductors are configured to produce the same inductance values.

16. The power converter of claim 1, wherein the power converter is a zero voltage switching symmetric full-bridge DC-output converter.

17. The power converter of claim 1, wherein the first and second clamp rectifiers comprise a clamp diode or a synchronous rectifier.

18. A power converter, comprising:
    an input port configured to receive a source of power;
    an output port configured to provide output power;
    a bridge circuit operatively coupled to the input port, the bridge circuit comprising:
        a first transistor coupled in series with a second transistor through a first connection node;
        a third transistor coupled in series with a fourth transistor through a second connection node;
        a first clamp diode coupled in series with a second clamp diode through a third connection node, wherein the first and second clamp diodes are coupled in parallel with the first and second transistors;
        a first resonant inductor coupled between the first connection node and a fourth connection node;
        a first clamp capacitor coupled between the third connection node and the fourth connection node;
        a third clamp diode coupled in series with a fourth clamp diode through a fifth connection node, wherein the third and fourth clamp diodes are coupled in parallel with the third and fourth transistors;
        a second resonant inductor coupled between the second connection node and a sixth connection node; and
        a second clamp capacitor coupled between the fifth connection node and the sixth connection node;
    a transformer operatively coupled to the bridge circuit, the transformer comprising a primary winding and at least one secondary winding, the primary winding coupled between the fourth connection node and the sixth connection node; and
    a current rectifying circuit operatively coupled to the secondary winding of the transformer and the output port.

19. The power converter of claim 18, wherein the power converter is a zero voltage switching symmetric full-bridge DC-output converter.

20. An electronic system comprising:
    at least one processor;
    at least on memory device operatively coupled to the processor; and
    at least one power converter electrically coupled to the processor and the memory unit, the power converter comprising:
        a bridge circuit comprising:
            a first transistor coupled in series with a second transistor through a first connection node;
            a third transistor coupled in series with a fourth transistor through a second connection node;
            a first clamp rectifier coupled in series with a second clamp rectifier through a third connection node, wherein the first and second clamp rectifiers are coupled in parallel with the first and second transistors;
            a first resonant inductor coupled between the first connection node and a fourth connection node;
            wherein only a first clamp capacitor is coupled between the third connection node and the fourth connection node, the first clamp capacitor operative to reduce power loss in the first and second clamp rectifiers;
            a third clamp rectifier coupled in series with a fourth clamp rectifier through a fifth connection node, wherein the third and fourth clamp rectifiers are coupled in parallel with the third and fourth transistors;
            a second resonant inductor coupled between the second connection node and a sixth connection node; and
            a second clamp capacitor coupled between the fifth connection node and the sixth connection node, the second clamp capacitor operative to reduce power loss in the third and fourth clamp rectifiers;
        a transformer operatively coupled to the bridge circuit; and
        a current rectifying circuit operatively coupled to the transformer.

21. The electronic system of claim 20, wherein the power converter is a zero voltage switching full-bridge DC-output converter.

22. The electronic system of claim 20, wherein the power converter is a zero voltage switching symmetric full-bridge DC-output converter.

23. A method comprising:
    receiving an input DC voltage at a resonant inductor in a bridge circuit comprising a first switch coupled with a second switch through a first connection node, a third switch coupled with a fourth switch through a second connection node, and a first clamp rectifier coupled with a second clamp rectifier through a third connection node, the resonant inductor coupled directly to the first connection node and directly to a fourth connection node, wherein a clamp capacitor is coupled between the third connection node and the fourth connection node;

generating control signals for the first switch and the second switch coupled to a transformer, the transformer comprising a primary winding coupled between the second connection node and the fourth connection node;

storing energy in the resonant inductor from the input DC voltage when the control signals turn on both of the first and second switches; and releasing energy from the resonant inductor through the transformer when the control signals turn on only one of the first and second switches;

wherein the clamp capacitor allows part of a current to flow to the third switch or the fourth switch to reduce power loss in the clamp rectifiers.

* * * * *